United States Patent [19]

Guagliardo et al.

[11] 4,317,895
[45] Mar. 2, 1982

[54] COATING COMPOSITIONS OF THERMOPLASTIC ACRYLIC-URETHANE COPOLYMERS

[75] Inventors: Matthew Guagliardo, Bloomfield; Edward Stone, Morris Plains, both of N.J.

[73] Assignee: Inmont Corporation, Clifton, N.J.

[21] Appl. No.: 162,984

[22] Filed: Jun. 25, 1980

Related U.S. Application Data

[63] Continuation of Ser. No. 465, Jan. 2, 1979, abandoned.

[51] Int. Cl.$^3$ .................... C08G 18/30; C08F 283/04; C08G 18/67
[52] U.S. Cl. ..................................... 524/500; 528/75; 525/455
[58] Field of Search .................. 528/75; 525/440, 455; 260/37 N

[56] References Cited

U.S. PATENT DOCUMENTS

| | | | |
|---|---|---|---|
| Re. 29,772 | 9/1978 | Niederhauser et al. | 528/49 |
| 3,008,917 | 11/1961 | Park et al. | 260/45.4 |
| 3,257,476 | 6/1966 | Tobolsky et al. | 260/859 |
| 3,291,859 | 12/1966 | Tobolsky et al. | 260/859 |
| 3,373,143 | 3/1968 | Chilvers et al. | 528/49 |
| 3,865,898 | 2/1975 | Tobolsky | 260/859 R |
| 3,868,431 | 2/1975 | Hutchinson | 525/440 |
| 3,966,681 | 6/1976 | Maeda et al. | 260/859 R |
| 3,968,089 | 7/1976 | Cuscurida et al. | 260/859 R |
| 3,994,764 | 11/1976 | Wolinski | 525/440 |
| 4,038,257 | 7/1977 | Suzuki et al. | 528/75 |
| 4,097,439 | 6/1978 | Darling | 528/75 |
| 4,128,600 | 12/1978 | Skinner et al. | 528/75 |
| 4,131,602 | 12/1978 | Hodakowski et al. | 528/49 |
| 4,145,509 | 3/1979 | Bhatia | 528/75 |
| 4,174,307 | 11/1979 | Rowe | 528/49 |

*Primary Examiner*—H. S. Cockeram
*Attorney, Agent, or Firm*—Michael R. Chipaloski

[57] ABSTRACT

A coating composition based on a thermoplastic copolymer prepared by polymerizing one or more ethylenically unsaturated monomers in the presence of a fully reacted polyurethane. The resulting copolymer can be coated as a clear film, air dried and has particular utility, when combined with pigments and metallics, in automotive finishes.

9 Claims, No Drawings

COATING COMPOSITIONS OF THERMOPLASTIC ACRYLIC-URETHANE COPOLYMERS

This is a continuation, of application Ser. No. 000,465, filed Jan. 2, 1979, abandoned.

BACKGROUND OF THE INVENTION

1. Field of the Invention

This invention relates to polymeric coating compositions which can be applied to a variety of substrates, and in particular, to a coating composition that is useful in automotive finishes.

2. Description of the Prior Art

A great need exists for a coating composition that can be used to repair damaged lacquer coatings, in particular, acrylic lacquer coatings which are widely used in the auto industry. A coating composition of this type would find wide use in the repair of damaged autos and trucks and in the production of autos and trucks where portions of the vehicle often require touch-up painting after assembly. Methacrylate coating compositions are well known in the art as shown by Crissey and Lowell U.S. Pat. Nos. 2,934,509 and 2,934,510, both issued on Apr. 26, 1960. Coating compositions formed from cellulose acetate butyrate and a methacrylate polymer have been successfully used on metal substrates as shown in Evans U.S. Pat. No. 2,849,409, issued Aug. 26, 1958. Polymers containing oxazoline drying oils have been used as coatings and are disclosed in Miranda et al U.S. Pat. No. 2,208,981, issued Sept. 28, 1965, and Purcell U.S. Pat. No. 3,248,397, issued Apr. 26, 1966. The coating compositions of these prior art patents are excellent for many uses but do not have the properties preferred for a repair composition.

Generally, films of the so-called methyl methacrylate lacquers prepared from polymers containing methyl methacrylate as a main monomer have excellent characteristics in such properties as colorlessness, transparency, gloss retention over a long period and resistance to yellowing.

However, when formed into a film, a methyl methacrylate lacquer obtained by polymerizing methyl methacrylate alone or in combination with a small amount of an acrylate of $C_2$–$C_{16}$ alkanol, e.g. ethyl acrylate, n-butyl acrylate or 2-ethylhexyl acrylate, or a methacrylate of $C_4$–$C_{16}$ alkanol, e.g. 2-ethylhexyl methacrylate or lauryl methacrylate (these monomers are so-called internal-plasticizing monomers), tends to form cracks in the film by swelling or shrinking action due to temperature variation or to moisture, and encounters difficulties in impact resistance and in adhesion onto coated substrate surfaces. Further, this kind of lacquer is liable to cause shrinking or cracking phenomenon when recoated onto its own film or overcoated onto other films. That is, the lacquer is inferior in recoating and overcoating.

In case the amounts of said plasticizable monomers are increased, the above drawbacks can be overcome to a considerable extent, but the resulting film becomes soft, and it becomes high in temperature susceptibility and thermoplastic tendency and also its gasoline resistance and water resistance deteriorates.

Even in the case of a methyl methacrylate lacquer in which an internal-plasticizing monomer has been used in such a suitable amount as to satisfy, from the standpoint of its composition, the hardness, gasoline resistance and crack resistance of the resulting film and such proportion as recoating and the like, these properties are not satisfactory, in practice, unless the molecular weight of the polymer employed is made higher than a definite limit. However, the molecular weight of a copolymer obtained by solution polymerization is closely connected with the viscosity of the copolymer solution, and therefore such methyl methacrylate lacquer cannot be applied, in general, unless it is diluted, before application, with a large amount of solvent. This indicates the fact that such a methyl methacrylate lacquer as mentioned above is not well retained on a substrate to be coated and cannot be applied thickly.

Polyurethanes constitute a broad class of polymeric materials having a wide range of physical characteristics. The polymers are usually produced through the interaction of a polyfunctional isocyanate with a polyfunctional chemical compound having an active hydrogen in its structure.

In U.S. Pat. Nos. 3,865,898, 3,257,476 and 3,291,859 there are disclosed block copolymers and processes for forming them. In U.S. Pat. Nos. 3,257,476 and 3,291,859 the block copolymers are of an A–B–A structure. These patents teach a synthesis route to the preparation of block copolymers wherein one block is a vinyl copolymer and the other block can generally be referred to as a polyurethane. In the general scheme of synthesis as taught by these patents, a prepolymer is formed by reacting an aromatic diisocyanate with a polymeric material having functional groups with active hydrogen to form an "isocyanate-capped" prepolymer. The prepolymer is then usually reacted with tert-butyl hydroperoxide, a cumene hydroperoxide, or a dual-functional free radical initiator to form a peroxycarbamate which has reactive sites capable of initiating the polymerization of ethylenically-unsaturated monomers to form a block copolymer.

SUMMARY OF THE INVENTION

It has now been found that a superior coating composition can be prepared based on a thermoplastic copolymer prepared by polymerizing one or more ethylenically unsaturated monomers in the presence of a fully reacted polyurethane. The thermoplastic acrylic-urethane copolymer can be coated as a clear film, air dried, and has particular utility, when combined with pigments and metallics, in automotive finishes.

DETAILED DESCRIPTION OF THE INVENTION

The present invention is directed to a coating composition comprising a copolymer of (a) one or more ethylenically unsaturated monomers and (b) a fully reacted polyurethane.

By ethylenically unsaturated monomer I mean any of the known polymerizable ethylenically unsaturated monomers characterized by the presence therein of at least one polymerizable ethylenic group. These monomers are well known in the art and include the hydrocarbon monomers such as butadiene, isoprene, styrene, alpha-methyl styrene and the like; substituted styrene such as chlorostyrene, dichlorostyrene, bromostyrene, p-vinylphenyl phenyl oxide and the like; the acrylic and substituted acrylic monomers such as methyl methacrylate, cyclohexyl methacrylate, benzyl methacrylate, methyl, ethyl and butyl acrylate, phenyl acrylate, phenyl methacrylate, alphachloroacrylonitrile and the like; the vinyl esters and vinyl ethers such as vinyl actate, vinyl acrylate, vinyl methacrylate, vinyl propyl ethers, vinyl butyl ethers and the like; acrylic acid and methacrylic acid; other water soluble monomers such as hydroxy ethyl acrylate or methacrylate, hydroxy propyl acrylate or methacrylate and the like. Any of the known polymerizable monomers can be used and the compounds listed above are illustrative and not restrictive of the monomers suitable for use in this invention.

The ethylenically unsaturated monomers which are preferred in the practice of this invention include the acrylic and substituted acrylic monomers as well as styrene.

The fully reacted polyurethane composition, in which the in situ polymerization of one or more ethylenically unsaturated monomers is effected, is formed by the reaction in a solvent of a diisocyanate component with a polyol and a compound containing at least two reactive functional groups. Suitable polyurethanes include water soluble or water reducible polyurethane compositions.

The diisocyanate components which are useful according to this invention include those conventionally used in preparing polyurethane resins and include for instance toluene diisocyanates, such as the 2,4- and 2,6-isomers and their mixtures, 1,5 naphthylene diisocyanate, p-phenylene diisocyanate, 3,3'-dimethyl-4,4'-diphenylmethane diisocyanate and 4,4'-diphenylmethane diisocyanate.

Preferred diisocyanates are the aliphatic type since it has been found that these provide better color stability in the finished coating. Examples include isophorone diisocyanate, 1,6-hexamethylene diisocyanate and methylcyclohexylene diisocyanate. Mixtures of diisocyanates can also be employed. An especially preferred diisocyanate is a cycloalkyl-substituted diisocyanate designated as bis (4-isocyanatocyclohexyl) methane and having the structure

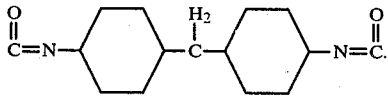

This diisocyanate is commercially available from E. I. duPont Chemical Company and referred to as Hylene W.

The polyols can be either low or high molecular weight materials and preferably include a mixture of the two and in general will have average hydroxyl values as determined by ASTM designation E-222-67, Method B, between about 1000 and 10, and preferably between about 500 and 50.

The polyols include low molecular weight diols. The low molecular weight diols useful in the instant invention are known in the art. They have hydroxy values of 200 or above, usually within the range of 1500 to 200. Such materials include aliphatic polyols, particularly alkylene polyols containing from 2 to 18 carbon atoms. Examples include ethylene glycol, 1,4-butanediol, 1,6-hexanediol, cycloaliphatic polyols such as 1,2-cyclohexanediol and cyclohexane dimethanol.

Where flexible and elastomeric properties are desired, the polyurethane should preferably contain at least a portion of a higher molecular weight polymeric polyol. Such a polymeric polyol should be predominantly linear (that is, absence of trifunctional or higher functionality ingredients) to avoid gelling of the resultant polymeric product and should have a hydroxyl value of 200 or less, preferably within the range of about 150-30.

The most suitable polymeric polyols include polyalkylene ether polyols including thio ethers, polyester polyols including polyhydroxy polesteramides and hydroxyl-containing polycaprolactones.

Any suitable polyalkylene ether polyol may be used including those which have the following structural formula:

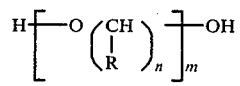

where the substituent R is hydrogen or lower alkyl including mixed substituents, and n is typically from 2 to 6 and m is from 2 to 100 or even higher. Included are poly (oxytetramethylene) glycols, poly (oxyethylene) glycols and polypropylene glycols.

Polyester polyols can also be used as a polymeric polyol component in the practice of the invention. The polyester polyols can be prepared by the polyesterification of organic polycarboxylic acids or anhydrides thereof with organic polyols. Preferably, the polycarboxylic acids and polyols are aliphatic or aromatic dibasic acids and diols.

Besides polyester polyols formed from polybasic acids and polyols, polycaprolactone-type polyesters can also be employed. These products are formed from the reaction of a cyclic lactone such as epilson-caprolactone with a polyol or a hydroxy acid.

The higher polymeric polyol component is preferably combined with low molecular weight polyol described above. It has been found that by blending high and low molecular weight polyols, optimum properties can be obtained in the resultant polyurethane. Preferably, the polymeric polyol is the major component, being present in an amount of about 25 to 95 percent by weight based on total weight of the polyol used to prepare the polyurethane, the remainder being low molecular weight polyol.

The polyurethane can be terminated with a compound containing at least one reactive functional (capping) group. The functional group can contain an active hydrogen atom that is displaced during the reaction with the isocyanate. These active hydrogen atoms are characterized by a positive Zerewitinoff test. The most common functional groups (capping agents) containing these active hydrogen atoms are

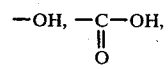

—SH, —NH$_2$. Some of the more common examples of capping agents are:
mono functional alcohols
   methanol, ethanol, isopropanol
difunctional —OH containing compounds
   1,4-butanediol, ethylene glycol, propylene glycol
mono functional organic acids
   formic acid, acetic acid
difunctional organic acids
   succinic acid, glutaric acid
difunctional amines
   1,2-propylene diamine, ethylene diamine The especially preferred compounds are the difunctional hydroxyl containing compounds.

The type and ratio of solvents used in the synthesis of the polyurethane and in the conversion of the acrylic monomer to polymer and the solubility of the acrylic-urethane copolymers formed is important.

The solvent(s) must be:

(a) volatile enough to form an air dry tack free film in 1 hr, (b) such that the solvent would not interfere with the polyurethane formation.

Similarly, it is also important that the solvent(s) have an effect on the drying characteristics and ultimate gloss of the dry coating. Suitable solvents include methyl ethyl ketone, methyl Cellosolve acetate, etc. and preferably a mixture of solvents such as a methyl Cellosolve acetate/methyl ethyl ketone mixture.

A ratio of from about 2 to about 7 parts acrylic monomer to 1 part fully reacted polyurethane can be used to prepare the copolymers according to this invention. An especially preferred ratio is 3 parts acrylic monomer to 1 part fully reacted polyurethane.

Pigments are used in the novel coating composition of this invention in the amounts of 0.1–20.0% pigment volume concentration, preferably, a pigment volume concentration of about 0.1–14% is used. Examples of the great variety of pigments which are used in the novel coating composition of this invention are metallic oxides, preferably titanium dioxide, zinc oxide, and the like, metal hydroxide, metal flakes, chromates, such as lead silica, talc, china clay, organic dyes and lead, iron blues, organic reds, maroons, and the like, organic dyes and lakes, etc.

The novel coating compositions of this invention can be applied to a variety of substrates, for example, wood, glass and metal, by any of the usual application methods, such as spraying, dipping, flowcoating and brushing. These coatings can be air dried or can be baked, for example, about 10–50 minutes at 125–175 degrees C. The resulting coatings or films can be rubbed or polished in accordance with conventional techniques, if desired, to improve smoothness gloss or both.

The novel coating compositions of this invention are particularly useful in repairing lacquer coatings and in particular acrylic lacquer coatings. The novel composition of this invention has excellent adhesion and durability when dry and can be pigmented to blend with refinished area with the adjacent areas of the coating which makes the refinished area unnoticeable.

The dried coatings of the compositons of this invention are characterized by increased freedom from water spotting and have excellent craze resistance in combination with outstanding durability and gloss retention. Coatings of this invention also have good gasoline resistance and improved adhesion as compared with conventional methyl methacrylate lacquers.

DESCRIPTION OF PREFERRED EMBODIMENTS

The following specific examples are given to further illustrate the invention. In the examples and elsewhere, the "parts" are by weight unless otherwise stated.

EXAMPLE I

| A reaction mixture consisting of | Parts |
| --- | --- |
| Polytetramethylene glycol, M.W. | 630 |
| of 2000 | |
| 1,4 Butanediol | 14.16 |
| bis(4-isocyanatocyclohexyl) methane (Hylene W) | 165.1 |
| 2-methoxyethyl acetate | 1503.0 |
| Dibutyl tin dilaurate | 0.8 | was heated at 75°–80° C. in a nitrogen atmosphere for three hours or until a constant NCO assay of <0.1 milliequivalents of NCO per gram of 35% solution was obtained. Sufficient 1,4 butanediol was added to reduce the NCO assay to about 0.035 milliequivalents of NCO per gram of 35% solution. At this point, sufficient 1,4 butanediol was added to produce a hydroxyl terminated polyurethane. The calculation of the amount of 1,4 butanediol was made as follows: Grams of 1,4 butanediol required = 0.035 milliequivalents of NCO per gram × batch weight in grams × molecular weight of butanediol/1000.

EXAMPLE II

The following compounds are substituted for the 1,4 butanediol of Example I.

(A) ethylene glycol
(B) propylene glycol
(C) isopropyl alcohol
(D) ethyl alcohol The reaction is followed as in Example I and fully reacted polyurethanes are obtained.

EXAMPLE III

Preparation of acrylic-urethane copolymer.

To a reactor was charged 280 parts of the hydroxyl terminated polyurethane from Example I, 294 parts of methyl methacrylate, 171 parts of methyl Cellosolve acetate, 235.0 parts of methyl ethyl ketone and 5.9 parts of t-butyl peroctoate. The reactants were heated to 85° C. for 3–4 hours in a nitrogen atmosphere for 6–7 hours producing a 40 percent solids polymer solution. A free film of this resin cast on glass and allowed to air dry was clear and glossy.

EXAMPLE IV

An acrylic-urethane copolymer was prepared similar to Example III except a portion (approximately 30%) of the methyl methacrylate was replaced by styrene. The copolymer produced formed a clear and glossy film when cast on glass and air-dried.

EXAMPLE V

The following acrylic monomers were substituted for the methyl methacrylate of Example III.

(A) ethyl methacrylate
(B) cyclohexyl methacrylate
(C) butyl methacrylate
(D) n-propyl methacrylate The reaction similar to Example III was followed and the copolymers so prepared are useful in the preparation of clear films.

EXAMPLE VI

Physical blend of polymethylmethacrylate and hydroxyl terminated polyurethane.

(a) Preparation of Polymethylmethacrylate

A reaction mixture consisting of the following was prepared:

|  | Parts |
| --- | --- |
| Methyl methacrylate | 550.0 |
| Methyl ethyl ketone | 342.7 |
| 2-methoxyethyl acetate | 342.6 |
| t butyl peroctoate | 11.0 |

One third of the above reaction mixture was charged to a reaction flask and heated in a nitrogen atmosphere to 85° C. at which time the remaining ⅔ was added dropwise over 1¼ hours, then held 3 hours at 85° C. At this time an additional 2.5 parts of t butyl peroctoate in 5 parts of methyl ethyl ketone was added and the reaction continued an additional 2.5 hours at 85° C., then cooled to room temperature. The resulting 44 percent solids solution was clear and colorless.

(b) Preparation of acrylic-urethane blend

To a reactor was charged the following:

|  | Parts |
| --- | --- |
| Polymethylmethacrylate (44% solids) from Example (a) | 441.5 |
| Hydroxyl terminated polyurethane from Example I | 185.0 |
| Methyl ethyl ketone | 45.4 |
| 2-methoxyethyl acetate | 9.7 |

The hazy incompatible mass was stirred one hour at room temperature (25° C.) with no improvement in compatibility. The reaction mixture was then heated to 100° C., held for 7 hours, then cooled to room temperature. The resulting hazy resin, on standing, separated into two layers. Thus it can be seen that physical blends of acrylic and urethane polymers are not useful according to this invention.

EXAMPLE VII

A coating composition was prepared using the copolymer of Example III.

| Pigment Dispersion | Parts by Weight |
| --- | --- |
| Example III polymer | 140.7 |
| Ethylene glycol mono ethyl ether acetate | 33.0 |
| Butyl acetate | 49.9 |
| Ethylene glycol mono ethyl ether | 30.6 |
| Toluene | 23.2 |
| Rutile titanium dioxide | 220.0 |
|  | 497.4 |

After ball milling the above to a fineness of 10 microns the following coating was prepared.

|  | Parts by Weight |
| --- | --- |
| Above Dispersion | 113.1 |
| Example III polymer | 198.2 |
| Butyl Benzyl Phthalate | 10.0 |
| Acrylic Lacquer Reducer | 327.5 |
|  | 648.8 |

The resulting lacquer had a weight solids of about 23.1% at 14 seconds Ford No. 4 spray viscosity and was useful as an automobile paint composition.

EXAMPLE VIII

|  | Parts by Weight |
| --- | --- |
| Example III polymer | 358.0 |
| Premix and Add |  |
| Aluminum Flake | 7.0 |
| Toluene | 8.6 |
| Adjust to spray viscosity with |  |
| Acrylic Lacquer Reducer | 606.4 |
|  | 980.0 |

The resulting lacquer had a weight solids of about 14.7% at 13 seconds Ford No. 4 spray viscosity and was useful as an automobile paint composition.

I claim:

1. A thermoplastic coating composition comprising
   (a) about 2 to about 7 parts by weight acrylic monomer, polymerized in the presence of
   (b) one part by weight fully reacted hydroxy terminated polyurethane containing no terminal unsaturation
wherein said coating composition contains no free unreacted monomer.

2. The coating composition of claim 1 containing pigment in a pigment volume concentration of about 0.1 to 14%.

3. The pigmented coating composition of claim 2 in which the acrylic monomer is selected from acrylic and methyl methacrylic monomers.

4. The pigmented coating composition of claim 2 wherein the polyurethane is formed from the reaction product of a diisocyanate component selected from the group consisting of isophorone diisocyanate, 1,6-hexamethylene diisocyanate, methylcyclohexylene diisocyanate and bis (4-isocyanatocyclohexyl) methane and a mixture of high and low molecular weight polyols.

5. The pigmented coating composition of claim 4 in which the fully reacted polyurethane is formed in a final step by capping with a difunctional hydroxyl compound selected from the group consisting of 1,4 butanediol, ethylene glycol and propylene glycol.

6. A thermoplastic coating composition comprising
   (a) 3 parts by weight methyl methacrylic monomer, polymerized in the presence of
   (b) 1 part by weight 1,4 butanediol capped polyurethane
wherein said coating composition contains no free unreacted monomer.

7. The coating composition of claim 6 containing pigment in a pigment volume concentration of about 0.1 to 14%.

8. The pigmented coating composition of claim 7 in which the acrylic monomer is selected from acrylic and methyl methacrylic monomers.

9. The pigmented coating composition of claim 7 wherein the polyurethane is formed from the reaction product of a diisocyanate component selected from the group consisting of isophorone diisocyanate, 1,6 hexamethylene diisocyanate, methylcyclohexylene diisocyanate and bis (4-isocyanateocyclohexyl) methane and a mixture of high and low molecular weight polyols.

* * * * *